United States Patent
Wambach et al.

(10) Patent No.: US 8,166,315 B1
(45) Date of Patent: Apr. 24, 2012

(54) METHOD FOR CALCULATING POWER FOR DATA STORAGE SYSTEMS

(75) Inventors: Robert F. Wambach, Westwood, MA (US); F. William French, Harvard, MA (US); Robert MacArthur, Leominster, MA (US); Robert Guenther, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 598 days.

(21) Appl. No.: 11/690,153

(22) Filed: Mar. 23, 2007

(51) Int. Cl.
*G06F 1/00* (2006.01)

(52) U.S. Cl. ....................................................... 713/300

(58) Field of Classification Search .................... 713/300
See application file for complete search history.

(56) References Cited

U.S. PATENT DOCUMENTS

| | | | | |
|---|---|---|---|---|
| 5,694,607 | A * | 12/1997 | Dunstan et al. | 713/340 |
| 7,058,480 | B1 * | 6/2006 | Kawanishi et al. | 700/286 |
| 7,493,235 | B2 * | 2/2009 | Artman et al. | 702/182 |
| 7,543,108 | B2 * | 6/2009 | Kakihara et al. | 711/112 |
| 2007/0038414 | A1 * | 2/2007 | Rasmussen et al. | 703/1 |
| 2007/0067559 | A1 * | 3/2007 | Fujibayashi et al. | 711/112 |
| 2007/0294552 | A1 * | 12/2007 | Kakihara et al. | 713/320 |

OTHER PUBLICATIONS

Information Disclosure Statement dated Apr. 26, 2010.

\* cited by examiner

*Primary Examiner* — Mohammed Rehman (57) ABSTRACT

A method for calculating power for a data storage system. The method includes: measuring power requirement for each one of a plurality of components for use in one of a plurality of possible system configurations; storing the measured power requirement in a table; entering into the table a specified one of the possible system configurations to obtain the power requirement for such one of the specified system configurations; calculating from the table the total power expected for the specified system configuration; presenting the calculated power to a user; determining whether the calculated power is acceptable or unacceptable to the user; and if determined to be unacceptable, entering into the table a new system configuration.

7 Claims, 7 Drawing Sheets

| COMPONENT TYPE | |
|---|---|
| DISK DIRECTOR TYPE A | P1 |
| DISK DIRECTOR TYPE B | P2 |
| DISK DIRECTOR TYPE C | P3 |
| FRONT END DIRECTOR TYPE A | P4 |
| FRONT END DIRECTOR TYPE B | P5 |
| MEMORY BOARD TYPE A | P6 |
| MEMORY BOARD TYPE B | P7 |
| DISK DRIVE UNIT TYPE A | P8 |
| DISK DRIVE UNIT TYPE B | P9 |

CONFIGURATION 1

| COMPONENT TYPE | QUANTITY |
| --- | --- |
| DISK DIRECTOR TYPE A | 0 |
| DISK DIRECTOR TYPE B | 2 |
| DISK DIRECTOR TYPE C | 0 |
| FRONT END DIRECTOR TYPE A | 4 |
| FRONT END DIRECTOR TYPE B | 0 |
| MEMORY BOARD TYPE A | 0 |
| MEMORY BOARD TYPE B | 3 |
| DISK DRIVE UNIT TYPE A | 16 |
| DISK DRIVE UNIT TYPE B | 0 |
| TOTAL POWER | 10,000 watts |

*FIG. 5*

CONFIGURATION 2

| COMPONENT TYPE | QUANTITY |
| --- | --- |
| DISK DIRECTOR TYPE A | 2 |
| DISK DIRECTOR TYPE B | 0 |
| DISK DIRECTOR TYPE C | 0 |
| FRONT END DIRECTOR TYPE A | 0 |
| FRONT END DIRECTOR TYPE B | 5 |
| MEMORY BOARD TYPE A | 2 |
| MEMORY BOARD TYPE B | 0 |
| DISK DRIVE UNIT TYPE A | 0 |
| DISK DRIVE UNIT TYPE B | 8 |
| TOTAL POWER | 9,500 watts |

*FIG. 6*

DMX-3 System Power Calculator

| System Bay Calculator | | Quantity | Comments |
|---|---|---|---|
| DMX-3 System Bay Models | | | |
| DMX3-SYS24-3D | DMX3 System Bay for 3-phase Delta Power | 1 | Power for 2 XCM's and 3 fan trays is included here |
| DMX3-SYS24-3Y | DMX3 System Bay for 3-phase Wye Power | 0 | Power for 2 XCM's and 3 fan trays is included here |
| Total Power for DMX-3 System Bay Overhead | | 414 | Total Input Watts For System Bay Overhead Power |
| DMX-3 Disk Director (DA) Models | | | |
| DMX3-1DAPAIR | | 0 | 2 Back End Directors and 2 Adapters |
| DMX3-2DAPAIR | | 0 | 4 Back End Directors and 4 Adapters |
| DMX3-3DAPAIR | | 0 | 6 Back End Directors and 6 Adapters |
| DMX3-4DAPAIR | | 1 | 8 Back End Directors and 8 Adapters |
| Total Power for DMX-3 Disk Directors | | 2,504 | Total Input Watts for Disk Directors |
| DMX-3 Disk Director (DA) Upgrades Models | | | |
| DMX3-1DAPAIRU | | 0 | 2 Back End Directors and 2 Adapters Upgrade |
| DMX3-2DAPAIRU | | 0 | 4 Back End Directors and 4 Adapters Upgrade |
| DMX3-3DAPAIRU | | 0 | 6 Back End Directors and 6 Adapters Upgrade |
| Total Power for DMX-3 Disk Director Upgrade | | 0 | Total Input Watts for Disk Director Upgrades |
| DMX-3 Front End Directors Models | | | |
| Quantity of DMX3-80000 | | 3 | 8-PORT FIBRE CHANNEL DIR (8 multimode ports) |
| Quantity of DMX3-71000 | | 0 | 8-PORT FIBRE CHANNEL DIR (7 multi/1 single mode port) |
| Quantity of DMX3-62000 | | 0 | 8-PORT FIBRE CHANNEL DIR (6 multi/2 single mode ports) |
| Quantity of DMX3-00004 | | 1 | 4-PORT FICON CHANNEL DIR (4 single mode ports) |
| Quantity of DMX3-00040 | | 0 | 4-PORT FICON CHANNEL DIR (4 multimode ports) |
| Quantity of DMX3-40002 | | 0 | 6-PORT MULTI-PROTOCOL DIR (4 FCM's port/2 Ficon sm) |
| Quantity of DMX3-60400 | | 0 | 4-PORT GigE CHANNEL DIRECTOR (4 multimode ports) |
| Quantity of DMX3-00103 | | 0 | 4-PORT MULTI-PROTOCOL DIR (1 GigE mm port/3 Ficon sm) |
| Quantity of DMX3-40200 | | 0 | 6-PORT MULTI-PROTOCOL DIR (4 FC mm ports/2 GigE mm) |
| Quantity of DMX3-60100 | | 0 | 7-PORT MULTI-PROTOCOL DIR (6 FC mm ports/1 GigE mm) |
| Quantity of DMX3-ESCON | | 0 | 8-PORT ESCON DIRECTOR (8 multimode ports) |
| Total Power for DMX-3 Front End Directors Models | | 2,504 | Total Input Watts For Front End Directors |
| DMX-3 Global Memory Director Models | | | |
| DMX3-M9-8G | | 0 | 8 GB Memory Boards |
| DMX3-M9-16G | | 8 | 16 GB Memory Boards |
| DMX3-M9-32G | | 0 | 32 GB Memory Boards |
| DMX3-M9-64G | | 0 | 64 GB Memory Boards |
| Total Power for DMX-3 Global Memory Directors | | 1,176 | Total Input Watts For Memory Boards |

| DMX-3 System Bay Input Power | 6,598 | Input Watts |
|---|---|---|
| DMX-3 System Bay Input Power | 6,678 | Input Volt-Amperes |

| Storage Bay Calculator | Quantity | Comments |
|---|---|---|
| DMX-3 Drive Enclosure Models | | |
| DMX3-170-DIR | 2 | |
| DMX3-120-UCH | 0 | |
| Total Number of DAE's | 16 | DAE's based on the # of drive enclosures selected above |
| Total Power for DAE Overhead | 1,237 | Total Input Watts For the DAE's Only (overhead) |
| DMX-3 Disk Drives | | |
| Quantity of 7.2K Disk Drives | 240 | 7200 RPM Disk Drives |
| Quantity of 10K Disk Drives | 0 | 10K RPM Disk Drives |
| Quantity of 15K Disk Drives | 0 | 15K RPM Disk Drives |
| Total Power for Disk Drives | 3,893 | Total Input Watts for Disk Drives |

| DMX-3 System Bay Input Power | 5,130 | Input Watts |
|---|---|---|
| DMX-3 System Bay Input Power | 5,394 | Input Volt-Amperes |

| Total Input Power | 11,728 | Input Watts For This System Configuration |
|---|---|---|
| Total Input Power | 12,072 | Input Volt-Amperes For This System Configuration |
| BTU/Hour | 40,026 | BTU/Hour For This System Configuration |

*FIG. 7*

DMX-3 System Power Calculator

| System Bay Calculator | Quantity | Comments |
|---|---|---|
| DMX-3 System Bay Models | | |
| DMX3-SYS24-3D   DMX3 System Bay for 3-phase Delta Power | 0 | Power for 2 XCM's and 3 fan trays is included here |
| DMX3-SYS24-3Y   DMX3 System Bay for 3-phase Wye Power | 1 | Power for 2 XCM's and 3 fan trays is included here |
| Total Power for DMX-3 System Bay Overhead | 414 | Total Input Watts For System Bay Overhead Power |
| DMX-3 Disk Director (DA) Models | | |
| DMX3-2DAPAIR | 1 | 2 Back End Directors and 2 Adapters |
| DMX3-2DAPAIR | 0 | 4 Back End Directors and 4 Adapters |
| DMX3-3DAPAIR | 0 | 6 Back End Directors and 6 Adapters |
| DMX3-4DAPAIR | 0 | 8 Back End Directors and 8 Adapters |
| Total Power for DMX-3 Disk Directors | 626 | Total Input Watts for Disk Directors |
| DMX-3 Disk Director (DA) Upgrades Models | | |
| DMX3-1DAPAIRU | 0 | 2 Back End Directors and 2 Adapters Upgrade |
| DMX3-2DAPAIRU | 0 | 4 Back End Directors and 4 Adapters Upgrade |
| DMX3-3DAPAIRU | 0 | 6 Back End Directors and 6 Adapters Upgrade |
| Total Power for DMX-3 Disk Director Upgrade | 0 | Total Input Watts for Disk Director Upgrades |
| DMX-3 Front End Directors Models | | |
| Quantity of DMX3-80000 | 16 | 8-PORT FIBRE CHANNEL DIR (8 multimode ports) |
| Quantity of DMX3-71000 | 0 | 8-PORT FIBRE CHANNEL DIR (7 multi/1 single mode port) |
| Quantity of DMX3-62000 | 0 | 8-PORT FIBRE CHANNEL DIR (6 multi/2 single mode ports) |
| Quantity of DMX3-00004 | 0 | 4-PORT FICON CHANNEL DIR (4 single mode ports) |
| Quantity of DMX3-00040 | 0 | 4-PORT FICON CHANNEL DIR (4 multimode ports) |
| Quantity of DMX3-40002 | 0 | 6-PORT MULTI-PROTOCOL DIR (4 FCom port/2 Ficon sm) |
| Quantity of DMX3-00400 | 0 | 4-PORT GigE CHANNEL DIRECTOR (4 multimode ports) |
| Quantity of DMX3-00403 | 0 | 4-PORT MULTI-PROTOCOL DIR (1 GigE mm port/3 Ficon mm) |
| Quantity of DMX3-40200 | 0 | 6-PORT MULTI-PROTOCOL DIR (4 FC mm ports/2 GigE mm) |
| Quantity of DMX3-66000 | 0 | 7-PORT MULTI-PROTOCOL DIR (6 FC mm ports/1 GigE mm) |
| Quantity of DMX3-ESCD8 | 0 | 8-PORT ESCON DIRECTOR (8 multimode ports) |
| Total Power for DMX-3 Front End Directors Modelse | 5,007 | Total Input Watts For Front End Directors |
| DMX-3 Global Memory Director Models | | |
| DMX3-M9-8GB | 0 | 8 GB Memory Boards |
| DMX3-M9-16GB | 16 | 16 GB Memory Boards |
| DMX3-M9-32GB | 0 | 32 GB Memory Boards |
| DMX3-M9-64GB | 0 | 64 GB Memory Boards |
| Total Power for DMX-3 Global Memory Directors | 2,353 | Total Input Watts For Memory Boards |
| DMX-3 System Bay Input Power | 8,400 | Input Watts |
| DMX-3 System Bay Input Power | 8,502 | Input Volt-Amperes |

| Storage Bay Calculator | Quantity | Comments |
|---|---|---|
| DMX-3 Drive Enclosure Models | | |
| DMX3-120-DAE | 2 | |
| DMX3-120-DAE4 | 0 | |
| Total Number of DAE's | 16 | DAE is based on the # of drive enclosures selected above |
| Total Power for DAE Overhead | 1,237 | Total Input Watts for the DAE's Only (overhead) |
| DMX-3 Disk Drives | | |
| Quantity of 72K Disk Drives | 240 | 7200 RPM Disk Drives |
| Quantity of 10K Disk Drives | 0 | 10K RPM Disk Drives |
| Quantity of 15K Disk Drives | 0 | 15K RPM Disk Drives |
| Total Power for Disk Drives | 3,893 | Total Input Watts for Disk Drives |
| DMX-3 System Bay Input Power | 5,130 | Input Watts |
| DMX-3 System Bay Input Power | 5,394 | Input Volt-Amperes |

| | | |
|---|---|---|
| Total Input Power | 13,530 | Input Watts For This System Configuration |
| Total Input Power | 13,896 | Input Volt-Amperes For This System Configuration |
| BTU/Hour | 46,177 | BTU/Hour For This System Configuration |

*FIG. 8*

METHOD FOR CALCULATING POWER FOR DATA STORAGE SYSTEMS

TECHNICAL FIELD

This invention relates generally to data storage systems and more particularly to methods for calculating power for such systems.

BACKGROUND

As is known in the art, large host computers and servers (collectively referred to herein as "data storage systems") require large capacity data storage systems. These storage systems generally include data processors, which perform many operations on data introduced to the host computer/server through peripherals including the data storage system. The results of these operations are output to peripherals, including the storage system.

One type of storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

Figure 1:
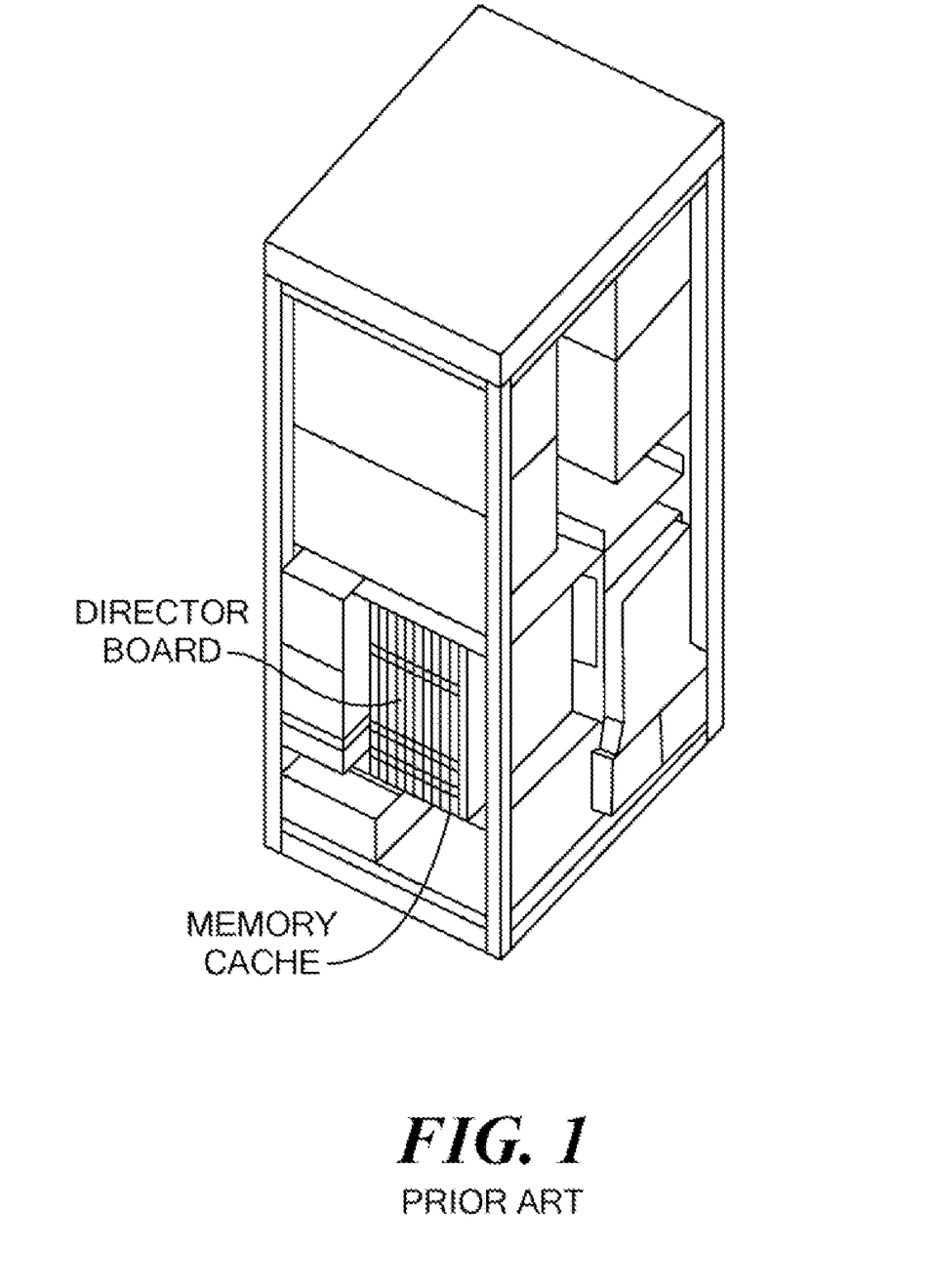
FIG. 1 is a sketch of a data storage system according to the prior art.

The host computer/server controllers, disk controllers and cache memory are interconnected through a backplane printed circuit board. More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane printed circuit board Referring now to FIG. 1, a storage system is shown to include an electrical cabinet having stored therein: a plurality of front-end director boards; a plurality of back-end, or disk director boards; and a plurality of memory boards.

As is also known in the art, many customers are constrained by the amount of power available to their Data Centers from the Utility companies. They are also very concerned about energy efficiency and want to minimize their electricity costs. In order to deploy new storage equipment they need to know how much power the machines will draw. Former approaches included using the nameplate power value of the machine which can greatly over estimate the actual. The nameplate value does not consider configuration options. A higher power number can prevent customers from purchasing new equipment. Some former approaches also included rudimentary spreadsheets that required expert knowledge to run and also enabled competitors to copy the information in them.

SUMMARY

In accordance with the present invention, a method is provided for calculating power for a data storage system. The method includes: measuring power requirement for each one of a plurality of components for use in one of a plurality of possible system configurations; storing the measured power requirement in a table; entering into the table a specified one of the possible system configurations to obtain the power requirement for such one of the specified system configurations; calculating from the table the total power expected for the specified system configuration; presenting the calculated power to a user; determining whether the calculated power is acceptable or unacceptable to the user; and if determined to be unacceptable, entering into the table a new system configuration.

In one embodiment, a method is provided for calculating power for a data storage system having a plurality of components, such components including interconnected memories, disk drives and directors. The method includes: measuring power requirement for each one of a plurality of types and/or quantity of the plurality of such components; storing the measured power requirement for each one of the plurality of types of the plurality of components in a table; entering one of the possible system configurations into a spreadsheet comprising entering a quantity of each one of the plurality of types of components into the spreadsheet comprising obtaining from the table the power requirement of the entered one of the plurality of types of the plurality of components power; determining whether all of the types of components have been entered into the table; calculating from the spreadsheet the total power expected for the specified one of the possible system configurations; presenting the calculated power to a user; determining whether the calculated power is acceptable to the user; and if determined to be unacceptable, entering into the spreadsheet a new one of the possible system configurations.

With such method a software based calculator tool is provided which can accurately estimate the power consumption of different configuration storage systems. Besides inputting the number and type of memory and director boards, the calculator can allow customers to input the number of disk drives, the disk drive speed and RAID configurations. In addition, the method provides an inventory list of existing deployed hardware using the call home feature of the storage products. The method has expert knowledge built in, which can limit the options to legal configurations. The output from the calculator is a power summary expressed in Kvolt-amps or Watts, BTU/hr (heat dissipation) and includes current phase balancing. The output can also be saved in many formats such as PDF, Word or HTML. Other features of the method include environmental factors such as weight, footprint and audio level.

The method provides a menu driven user interface to easily allow customers to input different configurations to determine resulting total power draw. Configurations include sites, systems, cabinets and enclosures with the ability to compare total power draw between different configurations. The user is able to select the correct storage configuration to meet their power budget and to right size their storage and scale as their storage needs grow.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 7 and 8 show more the spreadsheet with more typical system configurations than the simplified configurations of FIGS. 5 and 6.

Like reference symbols in the various drawings indicate like elements.

DETAILED DESCRIPTION

Figure 2:
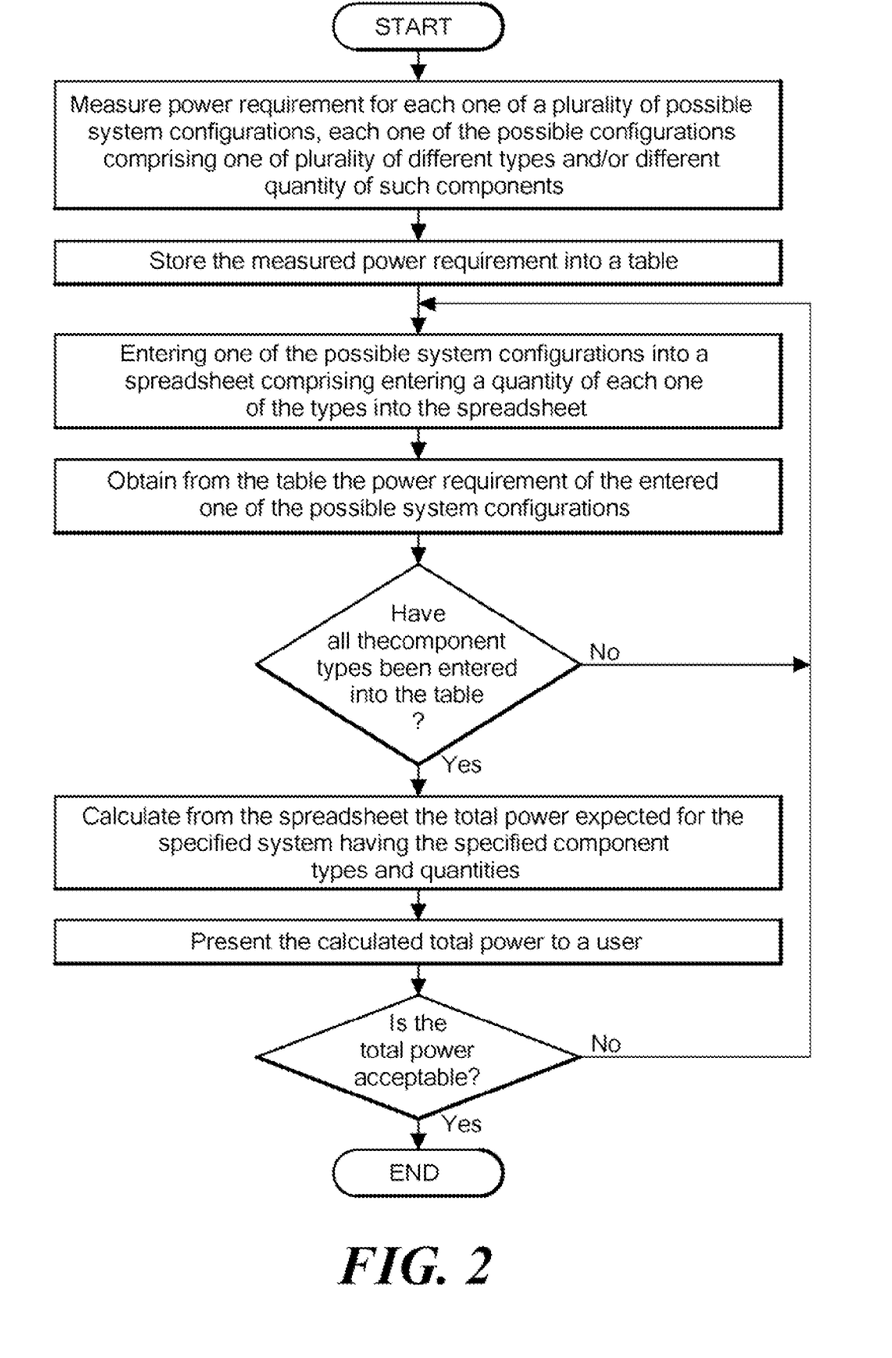
FIG. 2 is a flowchart of a method used to calculate power for a data storage system according to the invention.

Referring now to FIG. 2 a flowchart of the method used to calculate power for a data storage system is shown. Here, the flowchart is for a method for calculating power for a data storage system having a plurality of components, such components including interconnected memories, disk drives and directors. The method includes measuring power requirement for each one of a plurality of possible system configurations, each one of the possible system configurations comprising one of a plurality of different types and/or quantity of such components; storing the measured power requirement in a table; entering one of the possible system configurations into a spreadsheet comprising entering a quantity of each one of the plurality of types of the plurality of components into the spreadsheet; obtaining from the table the power requirement of the entered one of the possible system configurations; determining whether all of the types of components have been entered into the table; calculating from the spreadsheet the total power expected for the specified one of the possible system configurations; presenting the calculated power to a user; determining whether the calculated power is acceptable to the user; and if determined to be unacceptable, entering into the spreadsheet a new one of the possible system configurations.

More particularly, here the step of measuring power requirement for each one of a plurality of possible system configurations, each one of the possible system configurations comprising one of a plurality of different types and/or quantity of such components is as follows: A typical full system is configured. The total power of the system is measured. Each different type of component is removed one at a time and the reduction in power with the removed component type is measured thereby providing the power requirement for that removed component types.

Figure 3:
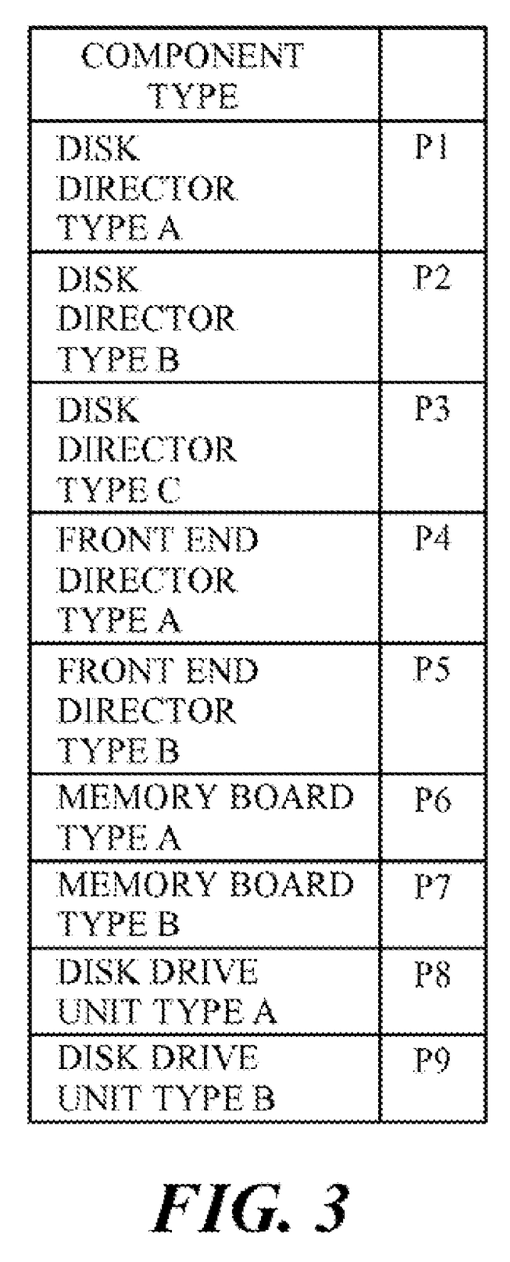
FIG. 3 is an exemplary table generated in accordance with the invention.

Next, the measured power of each component type is stored in a table of a memory, not shown, of the computer 10, as shown in FIG. 3. Here, in this example, each possible configuration can have:

a type A disk director (i.e., back end director) having a measure power requirement P1;
a type B disk directors having a power requirement P2;
a type C disk directors having a power requirement P3
a type A front end director having a power requirement P4;
a type B front end director having a power requirement P5;
a type A memory board having a power requirement P6;
a type B memory board having a power requirement P7;
a type A disk drive having a power requirement P9.

It should be understood that this is merely a simplified example of possible configurations. For example, other possible configurations may include different the disk drive speed and RAID configurations, as will be described below in connection with FIGS. 7 and 8.

Figure 4:
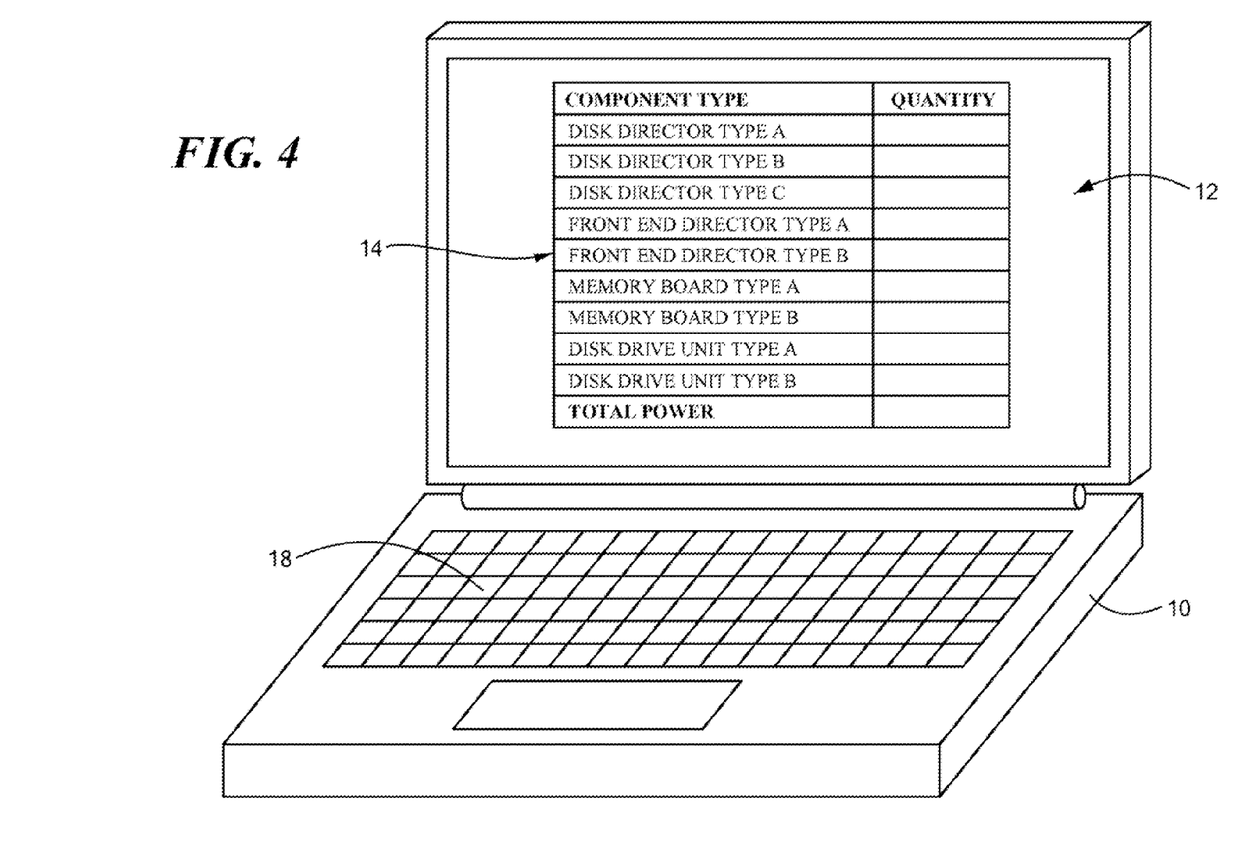
FIG. 4 is a sketch of a computer having on the display thereof a spreadsheet used in the method according to the invention, such computer having in a memory thereof the table of FIG. 3.
Figure 5:
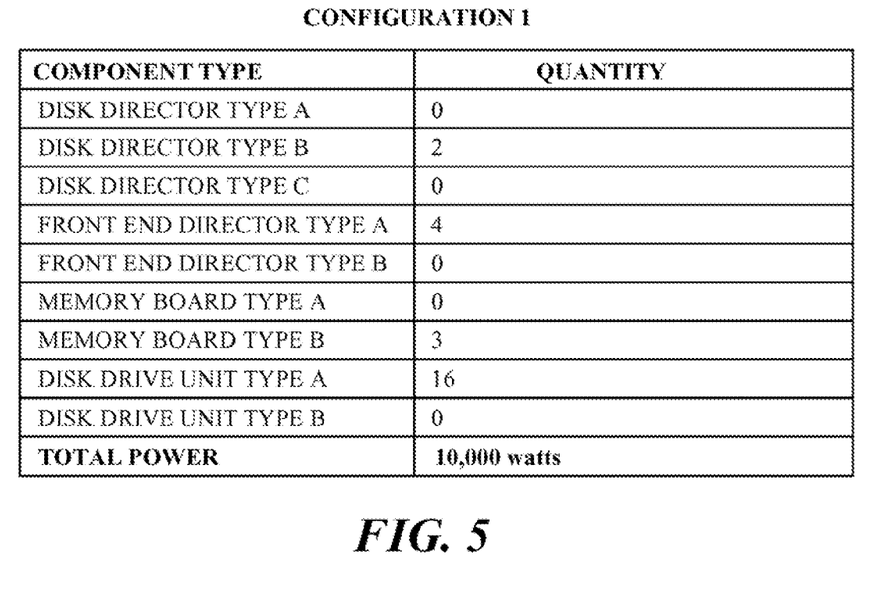
FIGS. 5 and 6 show the spreadsheet of FIG. 4 with two different, relatively simple system configurations for teaching purposes entered therein by a user and showing total power for each one of the configurations computed by the computer of FIG. 4.
Figure 6:
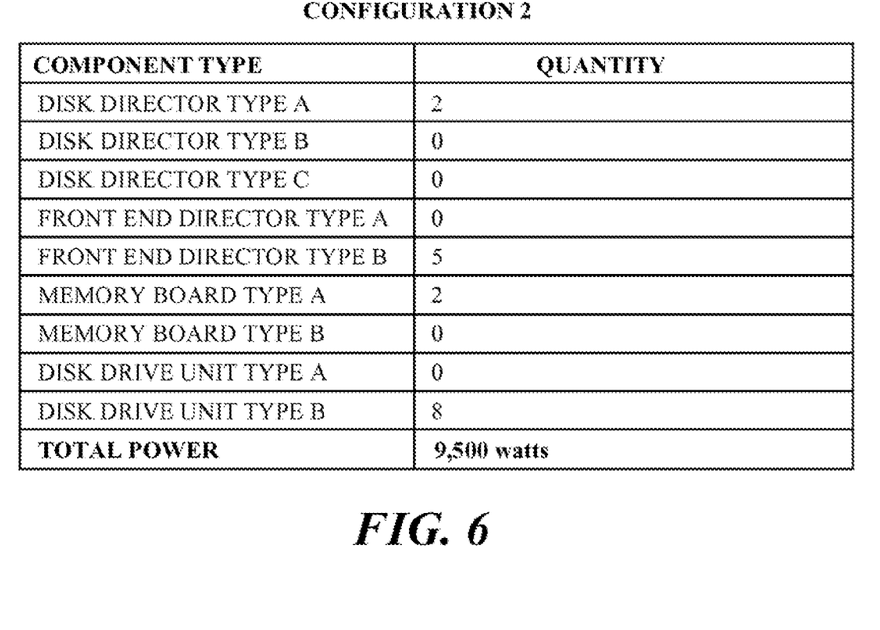

Next, the one of the possible system configurations is into a spreadsheet displayed on the display 12 of the computer 10 (FIG. 4). More particularly, a quantity of each one of the plurality of types of the plurality of components is entered into the spreadsheet 14, as shown in FIGS. 4, 5 and 6 for two different system configurations. The computer 10 obtains from the table stored therein the power requirement of the entered one of the types of components and multiplies the power by the quantity entered into the spreadsheet. The computer determines whether all of the types of components have been entered into the table as for example asking the user whether the configuration is complete. If all quantities have been entered the computer calculates from the spreadsheet the total power expected for the specified one of the possible system configurations and presents the calculated power to a user on the computer screen. The user determines whether the calculated power is acceptable or unacceptable. If the user determines the power to be unacceptable, the user enters into the spreadsheet a new one of the possible system configurations.

Thus, referring to FIGS. 3 and 5, here, in this example, there are: 2, type B disk directors; 4, type A front end directors; 3 type B memory boards and 16 type A disk drive units. The computer 10, receives from the following user data entered into the spreadsheet via the computer 10 keyboard 16 (FIG. 4): a quantity of 2, Type B disk directors; a quantity of 4, type B front end directors; a quantity of 3 type B memory boards and a quantity of 16 type A disk drive units. After entering such quantities into the computer, the processor, not shown, of the computer 10 looks up in the table stored the power requirements for a type B disk director, here from FIG. 3 a power requirement of P2 and multiplies such power requirement P2 by the quantity entered into the spreadsheet, FIG. 5, by the user, here the quantity 2 to obtain and stored in a memory of the computer 10 the product 2P2. Next, processor of the computer 10 looks up in the table stored the power requirements for a type A front end director, here from FIG. 3 a power requirement of P4 and multiplies such power requirement P4 by the quantity entered into the spreadsheet, FIG. 5, by the user, here the quantity 4 to obtain and stored in a memory of the computer 10 the product 4P4. Next, processor of the computer 10 looks up in the table stored the power requirements for a type B memory board, here from FIG. 3 a power requirement of P7 and multiplies such power requirement P7 by the quantity entered into the spreadsheet, FIG. 5, by the user, here the quantity 3 to obtain and stored in a memory of the computer 10 the product 3P7. Next, processor of the computer 10 looks up in the table stored the power requirements for a type A disk drive units, here from FIG. 3 a power requirement of P4 and multiplies such power requirement P7 by the quantity entered into the spreadsheet, FIG. 5, by the user, here the quantity 16 to obtain and stored in a memory of the computer 10 the product 16P7. Next the processor of the computer sums the products to produce the total power requirements for the specified configuration i.e., the sum=2P2+4P4+3P7+16P8, and presents the sum to the user on the spreadsheet 14 in FIG. 4 in the cell to the right of "TOTAL POWER".

If the user feels the power requirement is unacceptable, e.g., too great for the user's power sully, the user enters a new, different configuration into the spreadsheet, for example, the configuration shown in FIG. 6. Thus, referring to FIGS. 3 and 6, here, in this example, there are: 2, type A disk directors; 5, type B front end directors; 2 type A memory boards and 8 type N disk drive units. The computer 10, receives from the following user data entered into the spreadsheet via the computer 10 keyboard 16 (FIG. 4): a quantity of 2, Type A disk directors; a quantity of 5, type B front end directors; a quantity of 2 type A memory boards and a quantity of 8 type B disk drive units. After entering such quantities into the computer, the processor, not shown, of the computer 10 looks up in the table stored the power requirements for a type A disk director, here from FIG. 3 a power requirement of P1 and multiplies such power requirement P1 by the quantity entered into the spreadsheet, FIG. 5, by the user, here the quantity 2 to obtain and stored in a memory of the computer 10 the product 2P1. Next, processor of the computer 10 looks up in the table stored the power requirements for a type B front end director, here from FIG. 3 a power requirement of P5 and multiplies such power requirement P5 by the quantity entered into the spreadsheet, FIG. 5, by the user, here the quantity 5 to obtain and stored in a memory of the computer 10 the product 5P5. Next, processor of the computer 10 looks up in the table stored the power requirements for a type A memory board, here from FIG. 3 a power requirement of P6 and multiplies such power requirement P6 by the quantity entered into the spreadsheet, FIG. 5, by the user, here the quantity 2 to obtain and stored in a memory of the computer 10 the product 2P6. Next, processor of the computer 10 looks up in the table stored the power requirements for a type B disk drive units, here from FIG. 3 a power requirement of P9 and multiplies such power requirement P9 by the quantity entered into the spreadsheet, FIG. 5, by the user, here the quantity 9 to obtain and stored in a memory of the computer 10 the product 8P9. Next the processor of the computer sums the products to produce the total power requirements for the specified configuration i.e., the sum=2P1+5P5+2P6+8P9, and presents the sum to the user on the spreadsheet 14 in FIG. 4 in the cell to the right of "TOTAL POWER". As noted above, the examples presented above in connection with FIGS. 3-6 were relatively simple examples for purposes of illustration of the invention; more practical examples of spreadsheets are shown in FIGS. 7 and 8.

The basic calculation method also enables comparisons to older machines as well as competitive machines. A desired storage capacity and performance can be input and the calculator can show how many of the older machines can be consolidated into one newer one. The cost per KW of electricity cost can be input and the actual annual electricity cost or savings can be determined.

A further application of the calculator's output is to download the results into a database for further compilation. The power consumption, geometry and airflow for a given configuration can automatically be downloaded into a CFD (Computational Fluid Dynamics) computer simulation program. This can allow the user to see if the new configuration will cool properly in the Data Center. The net result is the invention can help save energy in the Data Center.

A number of embodiments of the invention have been described. Nevertheless, it will be understood that various modifications may be made without departing from the spirit and scope of the invention. For example, the disk drive speed and RAID configuration may also be entries in the spreadsheet. The output from the computer may be expressed in Kvolt-amps or Watts, BTU/hr (heat dissipation). The output can also be saved in many formats such as PDF, Word or HTML. Other features of the method may include environmental factors such as weight, footprint and audio level.

Accordingly, other embodiments are within the scope of the following claims.

What is claimed is:

1. A method for calculating power for a system, comprising:
   measuring power requirement for each one of a plurality of possible system configurations;
   storing the measured power requirement in a table;
   entering into the table a specified one of the possible system configurations to obtain the power requirement for such one of the specified system configurations;
   calculating from the table the total power expected for the specified system configuration;
   presenting the calculated power to a user;
   determining whether the calculated power is acceptable or unacceptable to the user;
and if determined to be unacceptable, entering into the table a new system configuration.

2. A method for calculating power for a data storage system having a plurality of components, such components including interconnected memories, disk drives and directors, such method comprising:
   measuring power requirement for each one of a plurality of possible system configurations, each one of the possible system configurations comprising one of a plurality of different types and/or quantity of such components;
   storing the measured power requirement in a table;
   entering one of the possible system configurations into a spreadsheet comprising entering a quantity of each one of the plurality of types of the plurality of components into the spreadsheet;
   obtaining from the table the power requirement of the entered one of the possible system configurations;
   determining whether all of the types of components have been entered into the table;
   calculating from the spreadsheet the total power expected for the specified one of the possible system configurations;
   presenting the calculated power to a user;
   determining whether the calculated power is acceptable to the user; and
   if determined to be unacceptable, entering into the spreadsheet a new one of the possible system configurations.

3. The method recited in claim 2 including calculating annual power cost of one plurality of possible system configurations.

4. The method recited in claim 2 including comparing energy costs among a plurality of different competitors.

5. The method recited in claim 2 including entering a desired storage capacity and performance and calculating a number of older systems that can be consolidated into a single new system.

6. A method for calculating power for a system, comprising:
   initially configuring the system with a plurality of different types of components;
   measuring the power of the initially configured system;
   removing each different one of the different types of component one at a time and measuring the power of the system after each one of the components is removed from the system to thereby measure power requirement for each one of a plurality of possible system configurations;
   storing in a table the measured power requirement for each one of a plurality of different types of components adapted for use in the system;

entering into the table a specified number of, and types of, the components defining a specified system configuration.

7. The method of claim 6, further comprising:
calculating from the table the total power expected for the specified system configuration;
presenting the calculated power to a user;
determining whether the calculated power is acceptable or unacceptable to the user;
and if determined to be unacceptable, entering into the table a new system configuration.

* * * * *